Figure 1:
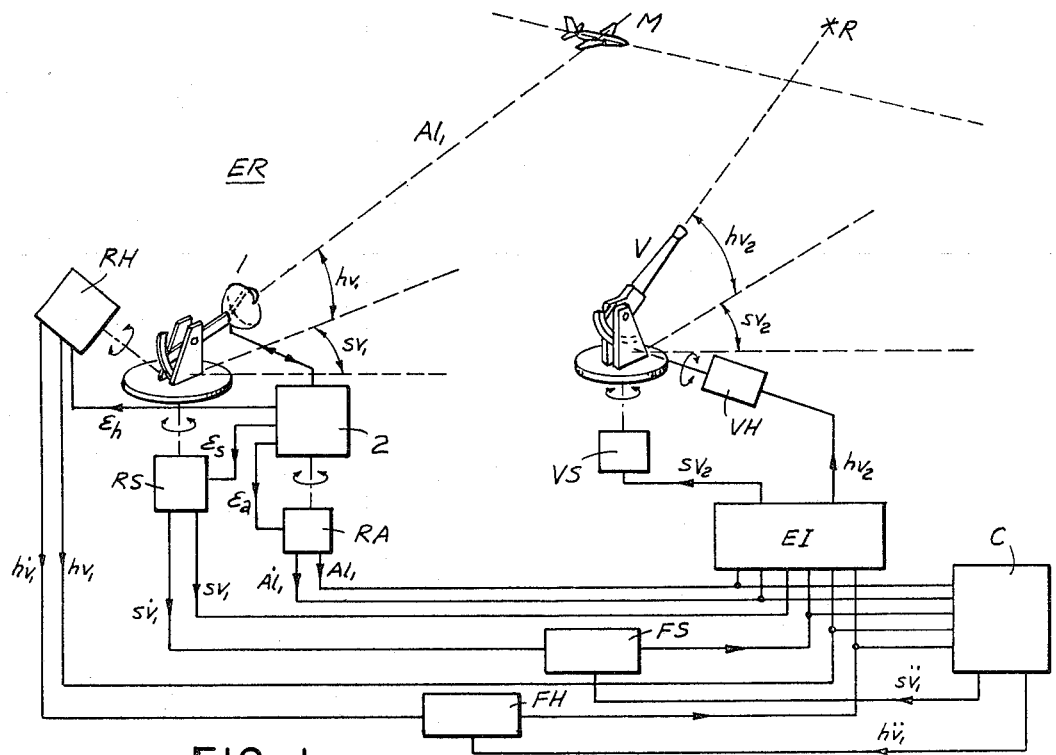

Dec. 13, 1966 ÅKE H. P. BLOMQVIST 3,290,992
SMOOTHING FILTER FOR A FIRE CONTROL SYSTEM
Filed Dec. 30, 1964

INVENTOR.
ÅKE HUGO PETRUS BLOMQVIST

_United States Patent Office_

3,290,992
Patented Dec. 13, 1966

3,290,992
SMOOTHING FILTER FOR A FIRE CONTROL
SYSTEM
Åke Hugo Petrus Blomqvist, Karlskoga, Sweden, assignor
to Aktiebolaget Bofors, Bofors, Sweden, a corporation
of Sweden
Filed Dec. 30, 1964, Ser. No. 422,125
Claims priority, application Sweden, Jan. 15, 1964,
499/64
7 Claims. (Cl. 89—41)

The present invention is related to a fire control system of the type comprising a sight for determining the coordinates of a target in a polar coordinate system and the velocity components of the target in the coordinate directions of the coordinate system, and which comprises also an electric fire control computer, to which said target data determined by the sight are supplied and which is arranged to compute from these data the point of aim, towards which a weapon is to be directed for firing at the target. Primarily, the invention is related to a fire control system of this type for combatting air targets and in which consequently the sight determines the position of a target in a plane-polar coordinate system that is, the azimuth angle, the elevation angle and the slanting range to the target and also the rates of change of the elevation angle, the azimuth and the radial distance respectively to the target. The invention is, however, also applicable to fire control systems for surface targets, as for instance ships, in which consequently the sight is determining the position of a target in a plane-polar coordinate system, that is, only the azimuth angle and the range to the target together with the rates of change in the azimuth angle and the radial distance to the target.

In modern fire control systems of the type mentioned above, the sight is normally a fire control radar station. The signals representing the target data determined by radar station, which are produced by the radar station and transferred to the fire control computer, will then comprise certain disturbances. This is particularly the case for the signals representing the rates of change in the angular coordinates of the target. These disturbances have various origins. The most serious disturbances are due to the fact that it is impossible to keep the radar antenna directed on the target without any fault. In fire control systems, at least, for air targets, the radar station is normally provided with an equipment for automatic tracking of the target in that the laying of the antenna in azimuth and in elevation as well as the setting of the range measuring unit of the radar station is carried out by servomotors, which are controlled by error signals generated in the radar station and representing the deviations between the azimuth angle and the elevation angle of the antenna and the true azimuth angle and the true elevation angle respectively to the target and the difference between the slanting range set in the radar station and the true slanting range to the target. The error signals representing the deviations in azimuth and elevation respectively are generally obtained by means of some type of lobe switching or lobing, that is by comparing the amplitudes of radar eachoes received in different directions. As, however, the target is not a point but has a certain dimension in elevation as well as in azimuth, the error signals controlling the traversing servo and the elevating servo of the radar antenna will be affected by an arbitrarily varying error, which is conveyed to the transversing and the elevating of the radar antenna and which consequently will appear as disturbances in the generated signals proportional to the rates of change of the azimuth angle and the elevation angle of the target, which signals are obtained by measurement of the traversing speed and the elevating speed, respectively of the antenna. A similar disturbance is caused by the unavoidable "fading," that is amplitude variation, of the radar echo pulses received from the target. The lobing equipment will interpret these amplitude variations as deviations in azimuth and elevation respectively between the direction of the antenna and the true direction to the target. Additional disturbances can be caused by mechanical imperfections of the traversing and elevating systems of the antenna, as for instance uneven running, play or similar imperfections. For these reasons it is necessary to filter at least those signals generated in the radar station, which are proportional to the angular velocities of the target, before these signals are used in the fire control computer for the computation of the point of aim.

In common fire control computers of the type hitherto used the position coordinates and the coordinate velocities for the target, which are determined by the radar station in a polar coordinate system, are converted into the corresponding coordinates and coordinate velocities in a cartesian coordinate system, where after all arithmethic operations for the computation of the point of aim are made in this Cartesian coordinate system and subsequently the Cartesian coordinates for the computed point of aim are converted into polar coordinates, that is into the azimuth angle and the elevation angle for the laying of the weapon towards the point of aim. In such a fire control system the necessary signal filtering does not involve any great problems, as it can be made on those signals, which are representing the coordinate velocities of the target in the Cartesian coordinate system and these coordinate velocities are constant provided that the target is moving in a straight course with a constant velocity, which is usually assumed.

If, on the contrary, the fire control computer is so designed that the calculation of the point of aim is made completely or for its largest part in the polar coordinate system, which is advantageous in itself as it gives a considerable reduction of the required number of components in the fire control computer, the filtering of the signals from the radar station representing the velocity components of the target will, however, become a considerably more difficult problem. In this case the filtering must obviously be made directly on the signals generated in the radar station, which are proportional to the coordinate velocities of the target in the polar coordinate system, that is to the azimuth velocity, any elevation velocity and the radial velocity of the target. Generally, however, it is then sufficient to filter only those signals, which are proportional to the angular velocities of the target, as the signal proportional to the radial velocity of the target is generally comprising a smaller amount of disturbances and furthermore the demands for accuracy in this signal are smaller. In certain cases it might, however, be necessary or desired to filter also the latter signal. Obviously, the coordinate velocities of the target in the polar coordinate system are not constant, even if it is assumed that the target is moving in a straight course with a constant velocity, but will display very large and rapid variations, which puts more exacting demands upon the filtering. Due to the filtering, however, a considerable delay is applied to the filtered signals. This can not be tolerated, as due to the rapid and large variations of the signals any delay of the signals will result in lag errors.

The object of the present invention is therefore to provide a fire control system of the type mentioned above, in which at least those signals generated by the sight, which are proportional to the angular velocities of the target in the polar coordinate system, are filtered directly before they are introduced into the fire control computer in such a way that a fully satisfactory filtering is obtained without any serious delay being applied to the signals and thereby lag errors being created. The fire control system according to the invention is characterized in that it comprises for each angular velocity of the target, which is determined by the sight in any of the angular coordinate directions of the polar coordinate system, an electric filter device, through which the electric signal generated by the sight, which is proportional to said angular velocity of the target is supplied to the fire control computer, and computer means for computing the angular acceleration of the target in the corresponding angular coordinate direction for the assumption that the target is moving in a straight course. A fire control system for air targets comprises, consequently, such a filter device for the azimuth velocity as well as the elevation velocity of the target, whereas a fire control system for surface targets will comprise such a filter device only for the azimuth velocity of the target. Each filter device comprises amplifying means with a capacitive feedback, to the input of which are supplied on the one hand a signal derived from the computer means proportional to the computed angular acceleration of the target and on the other hand through an integrating circuit a signal constituting the difference between the signal proportional to the angular velocity of the target supplied from the sight and the output signal of the amplifying means. Said output signal of the amplifying means is also the output signal from the filter device and is connected to the fire control computer.

When required the system according to the invention can also comprise a filter device of the type defined for the signal generated by the sight, which is proportional to the radial velocity of the target. In this case the computer means are arranged to compute also the radial acceleration of the target and to produce a signal proportional to this quantity, which signal is connected to the associated filter device in the manner mentioned above.

Figure 2:
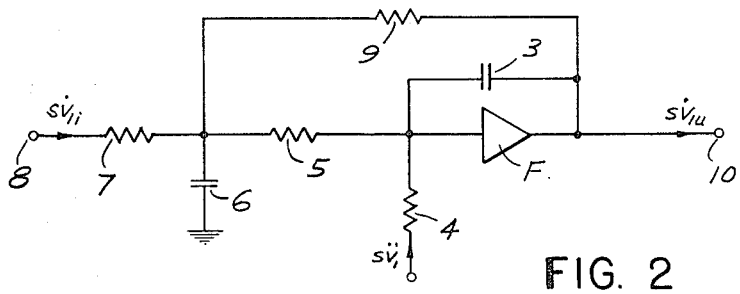
Figure 3:
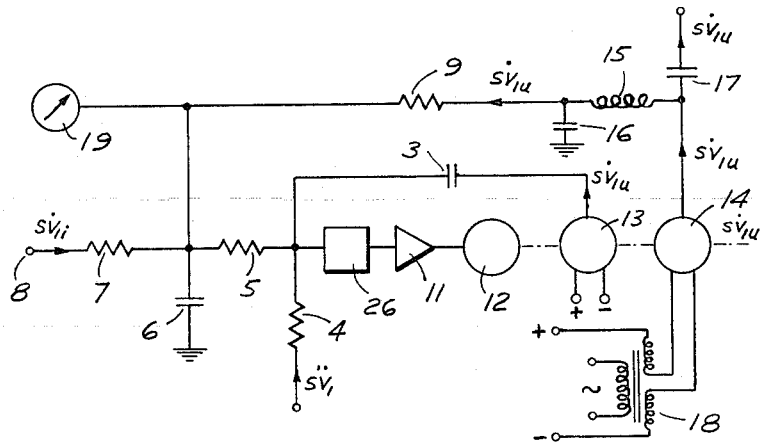
Figure 4:
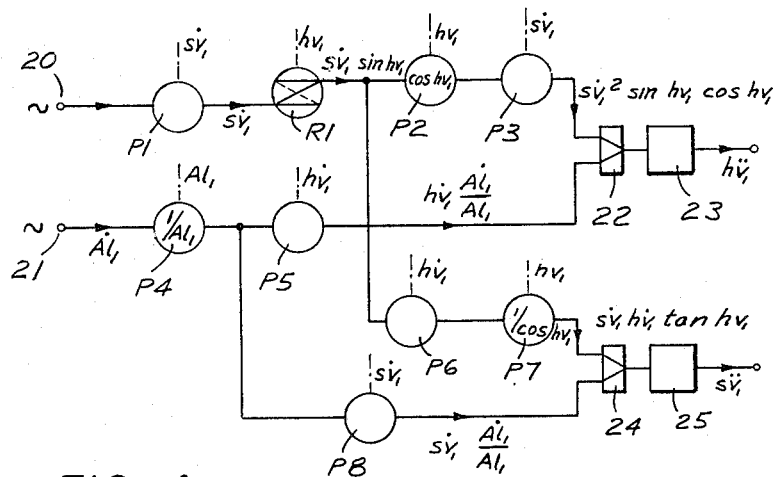

In the following the invention will be further described with reference to the accompanying drawing, in which FIG. 1 shows schematically a fire control system for air targets according to the invention, comprising filtering devices for those signals generated by the sight, which are proportional to the azimuth velocity and the elevation velocity of the target, FIG. 2 is a circuit diagram for a filter device according to the invention, FIG. 3 is a circuit diagram of a particularly advantageous filter device according to the invention and FIG. 4 shows schematically one practical design of the acceleration computer means in the fire control system shown in FIG. 1.

The fire control system shown in FIG. 1 comprises a fire control radar station ER for determining the azimuth angle $sv_1$, the elevation angle $hv_1$ and the slanting range $Al_1$ to a target M, and a weapon V for firing at the target. The antenna 1 of the fire control radar ER is in the conventional way connected to a transmitter-receiver equipment 2 for radar signals. The antenna 1 is directed in traverse by a servomotor device RS and elevated by a corresponding servomotor device RH. The transmitter-receiver equipment 2 comprises, as conventional, a range measuring unit for determining the slanting range $Al_1$ to the target M. The range measuring unit can be set by a servomotor device RA. It is assumed that the fire control radar is designed for automatic tracking of the target M in that its transmitter-receiver equipment 2 comprises means for producing a first error signal $\epsilon_s$, representing the deviation in azimuth angle between the direction of the antenna 1 and the true direction to the target, a second error signal $\epsilon_h$, representing the deviation in elevation between the direction of the antenna 1 and the true direction to the target M, and a third error signal $\epsilon_a$, representing the difference between the slanting range set in the range measuring unit of the radar station and the true slanting range to the target. These error signals $\epsilon_s$, $\epsilon_h$ and $\epsilon_a$ are connected to the traversing servo RS, the elevating servo RH and the range setting servo RA respectively so that these servos will try to direct the antenna 1 and adjust the range measuring unit respectively in such a way that the error signals become zero. The fire control radar will consequently automatically track the target M in direction as well as in range. In the practice the antenna servos RH and RS and possibly also the range setting servo RA are often supplied with additional control signals, assisting the radar error signals derived from the transmitter-receiver equipment 2 in directing the antenna and adjusting the range measuring unit onto to target.

From the traversing servo RS a first signal representing the azimuth angle $sv_1$ to the target and a second signal representing the state of change $\dot{sv}_1$ of the azimuth angle or the azimuth velocity of the target are derived. In the same way two signals are derived from the elevating servo RH, one representing the elevation angle $hv_1$ to the target and the second representing the rate of change of the elevation angle or the elevation velocity $\dot{hv}_1$ of the target. From the range setting servo RA two corresponding signals are derived representing the slanting range $Al_1$ to the target and the radial velocity $\dot{Al}_1$ of the target respectively. The signals representing the position coordinates of the target can for instance be derived from potentiometers, which are coupled to the shafts of the associated servomotors, whereas the signals proportional to the coordinate velocities of the target can be derived from tachogenerators coupled to the shafts of the servomotors. These signals can, however, of course be generated in any other suitable manner. Thus, for instance, the signals proportional to the coordinate velocities are often available in certain points in the servo circuits. The angular velocities of the target can also be derived by means of angular velocity sensitive gyros mounted on the antenna.

The target data determined by the fire control radar ER, that is the position coordinates and the coordinate velocities of the target in the polar coordinate system, are supplied to a fire control computer EI, which is arranged to compute on the basis of these data and additional necessary data, as for instance the projectile velocity, the air density, the force and direction of the wind and any parallax between the sites of the fire control radar and the weapon V, the point of aim R, to which the weapon V must be laid in any moment, if a projectile fired by the weapon is to hit the target M for certain assumptions regarding the future movements of the target M, as for instance that the target is continuing to move in a straight course with a constant speed. Consequently, the fire control computer EI computes the azimuth angle $sv_2$ and the elevation angle $hv_2$ from the site of the weapon to the point of aim R and produces signals corresponding to these angles. These signals are supplied from the fire control computer to a servomotor device VS for the laying of the weapon in traverse and a servomotor device VH for the elevation of the weapon respectively. These servomotor devices may be components of the computing circuits in the fire control computer so that the fire control computer produces error signals for the control of the servomotors laying the weapon in elevation and in traverse respectively. The arithmetic operations, which the fire control computer must carry out for the computation of the direction to the point of aim R, and in which way the fire control computer is to be designed to carry out these calculations constitute no part of the present invention and require consequently no detailed description for the understanding of the invention. A large number of different electric fire control computers for computing the position of the point of aim from the abovementioned target data determined by the sight are known in the prior art, for instance from Douch: "The Use of Servos in the Army During the Past War," IEE Journal, volume 94, 1947, part IIA, pages 177–189.

According to the invention, however, the fire control system comprises two filter devices FS and FH for filtering the signals supplied from the fire control radar, which are proportional to the angular velocity in azimuth $s\dot{v}_1$ and the angular velocity in elevation $h\dot{v}_1$ respectively of the target, before these signals are connected to the fire control computer. Furthermore, the fire control system comprises a computer unit C, to which the values determined by the fire control radar for the slanting range $Al_1$ and the elevation angle $hv_1$ to the target and for the radial velocity $\dot{A}l_1$, the azimuth velocity $s\dot{v}_1$ and the elevation velocity $h\dot{v}_1$ of the target are supplied. From these data and for the assumption that the target is moving in a straight course with for instance a constant velocity, this computer unit C is arranged to compute the angular acceleration in azimuth $s\ddot{v}_1$ and the angular acceleration in elevation $h\ddot{v}_1$ of the target and to produce signals proportional to these quantities. The signal proportional to the computed azimuth acceleration $s\ddot{v}_1$ is connected to the filter device FS for the azimuth velocity signal $s\dot{v}_1$ and the signal proportional to the computed elevation acceleration $h\ddot{v}_1$ is connected to the filter device FH for the elevation velocity signal $h\dot{v}_1$. The design of the filter devices FS and FH and the manner in which the signals from the computer unit C proportional to the angular accelerations of the target are connected to these filter devices will be further described in the following.

The two filter devices FS and FH are of identical design and therefore, FIG. 2 shows only the principal design of the one filter device, namely the filter device FS for the filtering of the signal from the traverse servo RS of the fire control radar, which is proportional to the angular velocity in azimuth $s\dot{v}_1$ of the target. The filter device comprises an amplifier F with a capacitive feedback through a capacitor 3. The amplifier is consequently coupled as an integrator. The signal voltage derived from the computer unit, which is proportional to the angular acceleration in azimuth $s\ddot{v}_1$ of the target is connected to the input of the amplifier F through a resistor 4. The signal voltage across a capacitor 6 is also connected to the input of the amplifier F through a resistor 5. The unfiltered azimuth velocity signal $s\dot{v}_{1i}$ from the fire control radar, which is supplied to the input terminal 8 of the filter device, is connected to the capacitor 6 through a resistor 7. Furthermore, the output voltage from the amplifier F and the filter device is connected to the capacitor 6 through a resistor 9 as a negative feedback. On the output terminal 10 of the filter device a filtered signal voltage $s\dot{v}_{1u}$ proportional to the angular velocity in azimuth of the target is obtained. The capacitor 6 and the resistors 7 and 9 will form an integrating circuit for the input signal $s\dot{v}_{1i}$ and the output signal feedback $s\dot{v}_{1u}$. The resistors 7 and 9 cooperate also with the resistor 5 in forming a subtracting circuit for the input signal and the output signal feedback. The output voltage for this integrating circuit across the capacitor 6 is connected through the resistor 5 to the input of the amplifier F together with the voltage proportional to the compute azimuth acceleration $s\ddot{v}_1$ connected to the input of the amplifier through the resistor 4. The resistors 5 and 4 are constituting an adder circuit for these two control signals for the integrator coupled amplifier F. The filter device has the filter function $$s\dot{v}_{1u} = \frac{s\ddot{v}_1}{p} + \frac{s\dot{v}_{1i} - \frac{s\ddot{v}_1}{p}}{1 + 2\rho\frac{p}{\omega} + \frac{p}{\omega^2}} - 2$$

where $\rho$ is a filter constant, $\omega$ the cut-off frequency and $p$ the operator quantity. Consequently, the filter device gives a very efficient filtering of the input signal and due to the regenerative signal computed by the computer united and proportional to the angular azimuth acceleration $s\ddot{v}_1$ of the target, which is connected to the filter device, a compensation for the filter delay is also obtained so that no lag errors will be created.

The form of the filter device shown in FIG. 2 and described above is, however, less suitable in several applications. It is often desired, for instance, that the signal generated by the sight, which is proportional to the angular velocity of the target can be a direct voltage signal, as such a signal can be produced by a direct voltage tachogenerator, which has a larger accuracy than an alternating voltage tachogenerator. In this case, however, the amplifier F in the filter device shown in FIG. 2 must be a direct voltage amplifier, and the output signal from the filter device will also be a direct voltage signal. For the fire control computer, however, an alternating voltage signal is generally desired, as the fire control computer is usually an electric analogue computer, which comprises electric resolvers and other components requiring alternating voltage signals. After a filter device according to FIG. 2 it would consequently be necessary to have a modulator for converting the direct voltage signal to an alternating voltage signal. It is, however, difficult to construct an accurate and stable modulator, which does not introduce any error in the modulated signal. Another fact which must be taken into consideration is that in the fire control computer the quantity proportional to the angular velocity of the target is required in several points for different arithmetic operations, which would result in a heavy loading of the amplifier F in a filter device according to FIG. 2, those arithmetic operations in the fire control computer in which the angular velocity of the target is taking part, are often multiplications of the angular velocities with other quantities. In electric analogue computers the multipliers consist preferably of potentiometers, which are set in agreement with the one quantity to be multiplied and are fed with a voltage proportional to the other quantity to be multiplied. In the fire control computer it is consequently often desired to use potentiometers, which can be set in agreement with the angular velocity of the target. In order to achieve this, when using a filter device according to FIG. 2, it should obviously be necessary to set said potentiometers by means of a servomotor device controlled from the signal proportional to the angular velocity of the target, which is derived from the filter device. Such a servomotor device makes of course the fire control computer more complicated and expensive.

For the reasons given in the preceding paragraph a filter device according to FIG. 3 is to be preferred. This filter device differs from that shown in FIG. 2 only in that the static amplifier F in the filter device according to FIG. 2 is replaced by a servo amplifier chain consisting of a modulator 26, a servo amplifier 11 and a servomotor 12. The filtered output quantity from this filter device will consequently be represented by the angle of rotation of the shaft of the servomotor 12. For generating electric feed back signals to the input of the servo amplifier chain and to the integrating circuit and for generating an electric output signal, two potentiometers 13 and 14 are coupled to the shaft of the servomotor 12. The one potentiometer 13 is fed from a constant reference direct voltage, so that the output voltage of the potentiometer will represent the output signal $s\dot{v}_{1u}$ of the servo amplifier chain. This signal is fed back through the capacitor 3 to the input of the servo amplifier chain. The second potentiometer 14 is supplied through a transformer 18 with a constant reference direct voltage as well as with an alternating voltage. The output voltage of this potentiometer will consequently comprise a direct voltage component, which is proportional to the output signal $s\dot{v}_{1u}$ of the filter device, as well as an alternating voltage component, which is also proportional to this output signal of the filter device. The direct voltage component is fed back to the capacitor 6 through a blocking circuit for the alternating voltage component consisting of a reactor 15 and a capacitor 16 and through the resistance 9. The alternating voltage component is connected through a coupling capacitor 17, which will block the direct voltage component, and can be used as an output signal from the filter device to be connected to the fire control computer.

Of course the direct voltage proportional to $s\dot{v}_{1u}$ from the potentiometer 13 could be used both for the feedback through the capacitor 3 to the input of the servo amplifier chain and for the feedback through the resistor 9 to the capacitor 6. In this case it would be sufficient to feed the potentiometer 14 with an alternating voltage and the components 15, 16 and 17 could be omitted. The only object of the potentiometer 14 would then be to give the electric output signal from the filter device to the fire control computer. In this case, however, the potentiometer 14 would not be enclosed by the feedback loop, due to which the output voltage of this potentiometer would not exactly reproduce the input signal, unless the two potentiometers 13 and 14 are exactly identical. It is, however, not possible to obtain two potentiometers, which are identical with the accuracy necessary for certain arithmetic operations in the fire control computer. In the form of the filter device shown in FIG. 3, however, the potentiometer 14 is enclosed by the feedback loop and the output voltage of the potentiometer will therefore be a true reproduction of the input signal with great accuracy.

The filter device according to FIG. 3 has the advantage that the amplifying means can consist of an alternating voltage amplifier 11. Certainly this requires a modulator 26, but this modulator is enclosed by the feedback loop and any unlinearity in this modulator will therefore not cause any substantial errors in the output signal of the filter device. Furthermore, a large number of potentiometers can be coupled to the shaft of the servomotor 12 so that several output signals are obtained from the filter device to the fire control computer. These potentiometers can then be used directly as multipliers in the fire control computer, if they are fed with alternating voltages proportional to those quantities, with which the angular velocity of the target is to be multiplied in each case. For arithmetic operations in the fire control computer, which require a large accuracy of the signal proportional to the angular velocity of the target, the output signal from the potentiometer 14 is however used. It should be observed that the alternating voltage feeding the potentiometer 14 does not need to be a constant reference voltage, but can be an alternating voltage proportional to a certain quantity, with which the angular velocity of the target is to be multiplied, in which case the potentiometer 14 will function as a multiplier for this quantity and the angular velocity of the target so that the alternating voltage signal from the capacitor 17 becomes proportional to the product of the angular velocity of the target and said other quantity.

As shown in FIG. 3 the signal appearing across the capacitor 6 in the filter device according to the invention can be tapped from the filter device and connected to indicating means 19. It can be shown, namely, that this signal is a measure upon the angular acceleration, which the target is displaying in the associated angular coordinate direction, if the target is deviating from the assumed straight course. The indicator means 19 will consequently serve as a turn indicator, which gives information about the direction in which the target is turning and also an idea about how sharp the turn is.

As mentioned above, the computer unit C is to compute the angular acceleration in azimuth $s\ddot{v}_1$ and the angular acceleration in elevation $h\ddot{v}_1$ of the target for the assumption that the target is moving in a straight course. Furthermore, it may be assumed for the sake of simplicity that the target is moving in this straight course with a constant velocity. The computer is then to be designed so as to compute a first quantity $$-2s\dot{v}_1\frac{\dot{A}l_1}{Al_1}+2s\dot{v}_1h\dot{v}_1 \tan hv_1$$

as a measure upon the angular acceleration in azimuth $s\ddot{v}_1$ of the target and a second quantity $$-s\dot{v}_1^2 \sin hv_1 \cos hv_1 - 2h\dot{v}_1\frac{\dot{A}l_1}{Al_1}$$

as a measure upon the angular acceleration in elevation $h\ddot{v}_1$ of the target and to produce direct voltage signals proportional to these quantities to be fed back to the filter device FS and the filter device FH, respectively, in the manner previously described.

FIG. 4 shows schematically a preferred electric analogue computer for these calculations. At the terminal 20 the computer unit is supplied with a constant reference alternating voltage, which is assumed to have the value 1 for the sake of simplicity. To the terminal 21 an alternating voltage is applied, which is proportional to the radial velocity $\dot{A}l_1$ of the target and may be derived from a suitable signal generator coupled to the shaft of the range setting servo AR in the fire control radar ER. The constant reference alternating voltage connected to the terminal 20 is feeding a potentiometer P1, which is coupled to the shaft of the servomotor 12 in the filter device FS for the azimuth velocity $s\dot{v}_1$. The output voltage of P1 is consequently proportional to $s\dot{v}_1$. This voltage is connected to the one input winding of a resolver R1, the rotor of which is coupled to the elevating servo RH of the fire control radar antenna so as to be rotated in agreement with the elevation angle $hv_1$ to the target. The output voltage from the resolver R1 is consequently proportional to the product $s\dot{v}_1 \sin hv_1$ and is connected to a potentiometer P2, which is also coupled to the elevating servo RH of the fire control radar antenna and has the characteristic $\cos hv_1$. The voltage from the potentiometer P2 is connected to an additional potentiometer P3, which is coupled in the same way as the potentiometer P1 to the shaft of the servomotor 12 in the filter device FS and which is consequently multiplying the applied voltage with the factor $s\dot{v}_1$. The output voltage from the potentiometer P3 is consequently proportional to $$s\dot{v}_1^2 \sin hv_1 \cos hv_1$$

and is connected to an adder circuit 22.

The alternating voltage proportional to the radial velocity $\dot{A}l_1$ of the target and connected to the terminal 21 is feeding a potentiometer P4, which is coupled to the shaft of the range setting servo RA and so designed that it multiplies the applied voltage with the factor $1/Al_1$. The output voltage from the potentiometer P4 is connected to an additional potentiometer P5, which is coupled to the shaft of the servomotor 12 in the filter device FH for the elevation velocity $h\dot{v}_1$ of the target and which is consequently multiplying the applied voltage with the factor $h\dot{v}_1$. The voltage from the potentiometer P5 is consequently proportional to $$h\dot{v}_1\frac{\dot{A}l_1}{Al_1}$$

and is also connected to the adder circuit 22. It is presupposed that the adder circuit 22 is adding the two applied voltages with such mutual polarities and in such mutual proportions that the output voltage from the adder circuit 22 becomes proportional to the above-mentioned expression for the angular acceleration in elevation $h\ddot{v}_1$. The output voltage from the adder circuit 22 is demodulated in a demodulator 23 so that a direct voltage signal is obtained proportional to the calculated value for the angular acceleration in elevation $h\ddot{v}_1$. This direct voltage signal is connected to the filter device FH in the manner previously described.

The output voltage from the resolver R1 proportional to $\dot{sv}_1 \sin hv_1$ is connected to a potentiometer P6, which is coupled to the shaft of the servomotor 12 in the filter device FH and which is consequently multiplying the applied voltage with $\dot{hv}_1$. The voltage from the potentiometer P6 is connected to an additional potentiometer P7, which is coupled to the shaft of the elevating servo RH and is so designed that it multiplies the applied voltage with the factor $1/\cos hv_1$. The voltage from the potentiometer P7 is consequently proportional to $$s\dot{v}_1 \dot{hv}_1 tghv_1$$

The voltage from the potentiometer P4 proportional to $\dot{Al}_1/Al_1$ is also connected to a potentiometer P8, which is coupled to the shaft of the servomotor 12 in the filter device FS and which is consequently multiplying the applied voltage with the factor $\dot{sv}_1$. The output voltage from the potentiometer P8 is consequently proportional to $$s\dot{v} \frac{\dot{Al}_1}{Al_1}$$

and is connected to an adder circuit 24 together with the voltage from the potentiometer P7. The adder circuit 24 is designed to add the two applied voltages with such mutual polarities and in such mutual proportions that the output voltage from the adder circuit 24 becomes proportional to the above given expression for the computed angular acceleration in azimuth $\ddot{sv}_1$ of the target. The output voltage from the adder circuit 24 is connected to a demodulator 25 so that a direct voltage is achieved proportional to the computed angular acceleration in azimuth $\ddot{sv}_1$ for the target. This direct voltage is connected to the filter device FS in the manner previously described.

The above described fire control system according to the invention comprises filter devices for filtering only the two signals from the fire control radar, which are proportional to the angular velocities of the target. Generally this is sufficient, as the signal generated by the fire control radar, which is proportional to the radial velocity $\dot{Al}_1$ of the target, is generally comprising a smaller amount of disturbances and furthermore the demand for accuracy is generally smaller for this signal. When necessary, however, it is also possible to provide the fire control system with an additional similar filter device for filtering also the signal proportional to the radial velocity $\dot{Al}_1$ of the target, before this signal is supplied to the fire control computer. In this case, of course, the computer C unit must be designed to compute also the radial acceleration of the target and to produce a signal proportional to this acceleration to be connected as a regenerative signal to the filter device for the $\dot{Al}_1$-signal.

In the foregoing the invention has been described with reference to a fire control system for air targets, in which the sight, that is the fire control radar, determines the azimuth angle as well as the elevation angle to the target and thus also the angular velocity in azimuth as well as the angular velocity in elevation of the target. The invention is, however, also applicable to fire control systems for surface targets, in which systems of course no elevation angle to the target is determined but only the azimuth angle of the target and the angular velocity in azimuth together with the radial distance and the radial velocity of the target. Certainly, the angular velocity of a surface target, as for instance a ship, is considerably smaller than for an air target and is also varying more slowly than for an air target, wherefore from this point of view a very careful filtering with a compensation for the filter delay as obtained with the present invention should generally not be necessary. On the other hand, however, the time of flight for the projectile will be much longer when firing at a surface target than when firing at an air target, in view of which an exact value for the angular velocity in azimuth of the target is necessary and consequently a filtering of the signal proportional to the angular velocity in azimuth of the target may be desired.

Furthermore, it should be noted that, although the invention is particularly advantageous in connection with fire control computers, which are computing the point of aim for the weapon entirely or for the larger part in the polar coordinate system, it is of course also possible to use the invention in connection with fire control computers, in which the polar coordinates and coordinate velocities of the target are first converted into the corresponding Cartesian coordinates and coordinate velocities, whereafter the point of aim is computed in the Cartesian coordinate system and finally the Cartesian coordinates for the point of aim are retransformed into the corresponding polar coordinates.

I claim:

1. A fire control system, comprising a sight for determining the coordinates of a target in a polar coordinate system and the velocity components of the target in the coordinate directions of said coordinate system and for generating electric signals proportional to said target data determined by the sight, means for conveying said electric signals to an electric fire control computer for computing from said target data the point of aim for a weapon, which is to fire at the target, said signal conveying means comprising an electric filter device for each electric signal generated by said sight, which is proportional to an angular velocity of the target in an angular coordinate direction of said polar coordinate system, computer means for computing the angular accelerations of the target in said angular coordinate directions for the target in said angular coordinate directions for the assumption that the target is moving in a straight course, said filter device comprising amplifying means having input circuit means and output circuit means and a capacitive feedback from said output circuit means to said input circuit means and an integrating circuit having an output supplied to said input circuit means, a signal proportional to the computed angular acceleration of the target in the associated angular coordinate direction being supplied from said computer means to said input circuit means of said amplifying means and a signal being the difference between the signal supplied from the sight and proportional to the angular velocity of the target in the associated angular coordinate direction and the output signal of the amplifying means being supplied to said integrating circuit, the output signal of said amplifying means constituting the output signal of said filter device.

2. A fire control system according to claim 1, wherein said amplifying means comprise a servomotor controlled by signals supplied to said input circuit means of said amplifying means so as to rotate in response to said signals, and said output circuit means comprise signal-generating means coupled to the shaft of said servomotor for generating an output signal from the said amplifying means and said filter device, corresponding to the angle of rotation of said servomotor.

3. A fire control system according to claim 2, wherein said signal-generating means comprise first and second potentiometers coupled to the shaft of said servomotor, said first potentiometer being fed from a constant direct voltage and its output voltage being supplied through said capacitive feedback to said input circuit means of said amplifying means, said second potentiometer being fed with a constant direct voltage as well as an alternating voltage and its output voltage being supplied through a blocking filter for the alternating voltage component of said output voltage to said integrating circuit and through a coupling capacitor to said fire control computer.

4. A fire control system according to claim 1, wherein the output signal of said amplifying means and the signal supplied from said sight proportional to the angular velocity of the target in the associated angular coordinate direction are connected through each one resistor across a capacitor, the signal across said capacitor and the signal supplied from said computer means proportional to the computed angular acceleration of the target in the associated angular coordinate direction being connected through each one resistor to said input terminal of said amplifying means.

5. A fire control system according to claim 4, wherein the signal across said capacitor is connected to signal indicating means.

6. A fire control system according to claim 1, wherein said sight is determining the azimuth angle $sv_1$, the elevation angle $hv_1$ and the slanting range $Al_1$ to the target and the angular velocity in azimuth $s\dot{v}_1$, the angular velocity in elevation $h\dot{v}_1$ and the radial velocity $\dot{A}l_1$ of the target and generating electric signals proportional to said target data, comprising an electric filter device for each one of said electric signals proportional to said angular velocity in azimuth and said angular velocity in elevation respectively of the target, said computer means being arranged to compute a first quantity $$-s\dot{v}_1{}^2 \sin hv_1 \cos hv_1 - 2h\dot{v}_1\frac{\dot{A}l_1}{Al_1}$$

and generate a first electric signal proportional to said first quantity, representing the angular acceleration in elevation of the target, said first electric signal being supplied to the filter device for the signal proportional to the angular velocity in elevation of the target, and to compute a second quantity $$-2s\dot{v}_1\frac{\dot{A}l_1}{Al_1}+2s\dot{v}_1h\dot{v}_1 \tan hv_1$$

and generate a second electric signal proportional thereto, representing the angular acceleration in azimuth of the target, said second signal being supplied to the filter device for the signal proportional to the angular velocity in azimuth of the target.

7. A fire control system according to claim 1, wherein said signal conveying means comprise an additional filter device of said design for the signal generated by the sight proportional to the radial velocity of the target, said signal being supplied to said fire control computer through said filter device, and said computer means are arranged to compute also the radial acceleration of the target and to generate a signal proportional thereto supplied to said additional filter device in the manner defined.

No references cited.

SAMUEL FEINBERG, *Primary Examiner.*

BENJAMIN A. BORCHELT, *Examiner.*

S. C. BENTLEY, *Assistant Examiner.*